(12) United States Patent
Abd Elhamid et al.

(10) Patent No.: US 8,834,734 B2
(45) Date of Patent: Sep. 16, 2014

(54) SURFACE ALLOYING OF STAINLESS STEEL

(75) Inventors: Mahmoud H. Abd Elhamid, Troy, MI (US); Gayatri Vyas Dadheech, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 648 days.

(21) Appl. No.: 13/153,844

(22) Filed: Jun. 6, 2011

(65) Prior Publication Data

US 2012/0308917 A1 Dec. 6, 2012

(51) Int. Cl.
*C03C 15/00* (2006.01)

(52) U.S. Cl.
USPC ........... 216/106; 216/100; 216/102; 205/217; 205/218

(58) Field of Classification Search
USPC ............... 216/58, 67, 108, 100, 106, 102; 205/205, 207, 217, 227, 243, 640; 429/485, 488
See application file for complete search history.

(56) References Cited

U.S. PATENT DOCUMENTS

| | | | | |
|---|---|---|---|---|
| 2005/0045250 | A1* | 3/2005 | Rakowski | 148/241 |
| 2009/0269649 | A1* | 10/2009 | Jeon et al. | 429/34 |
| 2010/0129697 | A1* | 5/2010 | Jeon et al. | 429/34 |
| 2010/0193082 | A1* | 8/2010 | Hasegawa et al. | 148/287 |
| 2011/0024002 | A1 | 2/2011 | Ishikawa et al. | |

FOREIGN PATENT DOCUMENTS

| | | |
|---|---|---|
| CN | 1446383 A | 10/2003 |
| CN | 101567455 A | 10/2009 |
| CN | 101601158 A | 12/2009 |
| WO | 0213300 A1 | 2/2002 |

* cited by examiner

*Primary Examiner* — Lan Vinh
(74) *Attorney, Agent, or Firm* — Dinsmore & Shohl LLP

(57) ABSTRACT

One aspect of the invention is a method of surface alloying stainless steel, In one embodiment, the method includes providing a stainless steel surface having an initial amount of iron and an initial amount of chromium; and preferentially removing iron from the stainless steel surface to obtain a surface having an amount of iron less than the initial amount of iron and an amount of chromium greater than the initial amount of chromium. Another aspect of the invention is a unitary stainless steel article.

13 Claims, 2 Drawing Sheets

SURFACE ALLOYING OF STAINLESS STEEL

BACKGROUND OF THE INVENTION

This invention relates generally to alloys, and more particularly to alloys formed on the surface of stainless steel.

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with electrode layers (e.g., containing at a minimum one catalyst type and one ionomer type) on both sides. The catalyst coated PEM is positioned between a pair of gas diffusion media layers, and a cathode plate and an anode plate are placed outside the gas diffusion media layers. The components are compressed to form the fuel cell.

FIG. 1 shows one embodiment of a fuel cell 10. The fuel cell includes a PEM 15 between a pair of electrodes 20. The electrodes 20 form a cathode and an anode for the fuel cell. The electrodes 20 may be deposited onto the PEM 15, as in the CCM design, to form an MEA 25. There is a gas diffusion media (GDM) 30 adjacent to each of the electrodes 20. Alternatively, the electrodes 20 can be deposited onto the GDM, as in the CCDM design. Adjacent to each of the GDM is a fuel cell plate 35. These fuel cell plates can be unipolar or bipolar plates, as known in the art.

The anode and cathode plates are typically made of stainless steel. The surface composition of stainless steel is known to affect its properties. For example, iron contributes significantly to the composition of the passive oxide films on entry grade stainless steels and other highly alloyed stainless. In addition, the presence of iron in the passive films of nickel/chromium alloys increases contact resistance with carbon-type papers (such as are used as GDM). Chromium contributes to the corrosion resistance of stainless steel. Chromium is also a well known adhesion promoter, and it can contribute significantly to the adhesion of gaskets on stainless steels.

As a result, the surface of the stainless steel fuel cell plates has been coated to obtain the desired properties, such as corrosion resistance and adhesion. For example, plating techniques and physical vapor deposition (PVD) have been used to coat stainless steel with alloys with high chromium and/or titanium content or layers of chromium and/or titanium in order to improve the corrosion resistance, or adhesion, for example. However, these plating and PVD coating methods are expensive. Moreover, there can be adhesion problems between the additional layers.

SUMMARY OF THE INVENTION

One aspect of the invention is a method of surface alloying stainless steel. In one embodiment, the method includes providing a stainless steel surface having an initial amount of iron and an initial amount of chromium; and preferentially removing iron from the stainless steel surface to obtain a surface having an amount of iron less than the initial amount of iron and an amount of chromium greater than the initial amount of chromium.

Another aspect of the invention is a unitary stainless steel article. In one embodiment, the article has a surface amount of iron less than a bulk amount of iron and a surface amount of chromium greater than a bulk amount of chromium.

DETAILED DESCRIPTION OF THE INVENTION

The invention allows the production of surface alloys on different types of stainless steel without the necessity of using expensive coating techniques.

Iron is removed from the surface of the stainless steel alloy using thermal and/or chemical methods, producing a surface enriched with chromium and nickel, as well as other metals, such as vanadium or titanium, if they were originally in the stainless steel. The ratio of iron to chromium at the surface can be at least about 1:1.5, or at least about 1:2, or at least about 1:2.5, or at least about 1:3, or at least about 1:3.5, or at least about 1:4. The surface enrichment can be measured using X-Ray photoelectron spectroscopy (XPS) surface analysis. This process allows the use of a lower grade stainless steel alloy for an application, but with the improved surface properties of a higher grade alloy.

The enriched layer can be up to about 1 micron thick, typically about 1 nm to about 750 nm, or about 1 nm to about 500 nm, or about 1 nm to about 250 nm, or about 1 nm to about 100 nm.

Figure 1:
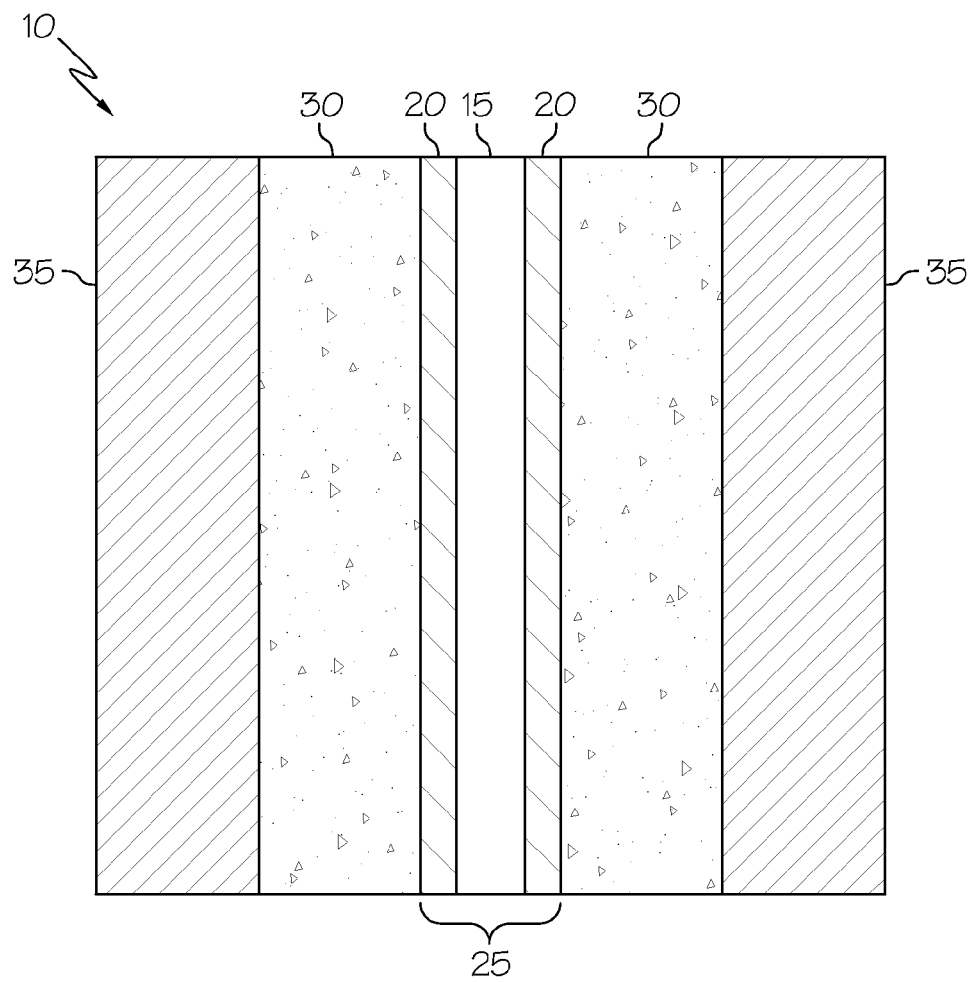
FIG. 1 is an illustration of a fuel cell.
Figure 2:
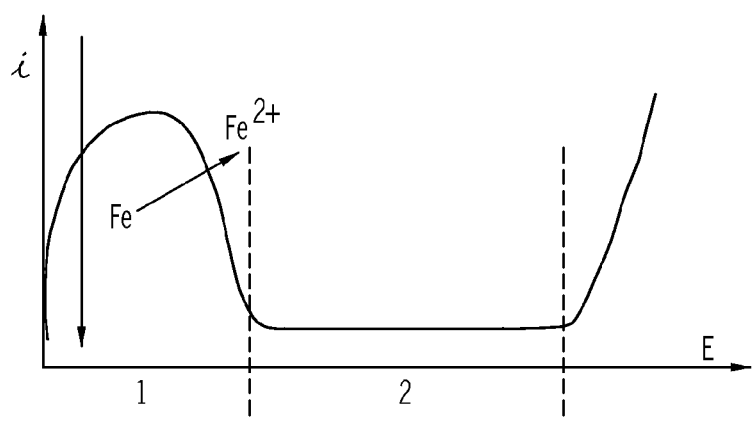
FIG. 2 is an illustration of the active region of the polarization curve.

The surface enrichment can be achieved in several ways. In one method, the potential of the stainless steel is held in the active region 1 of the polarization curve, as illustrated in FIG. 2. Under these conditions, the passive film no longer protects the surface, and the iron dissolves as ferrous ions. The soluble ferrous ions are then removed electrochemically or by plasma etching, leaving behind a layer which is rich in chromium, see Table 1. Table 1 shows the XPS Semi quantitative Elemental Surface Composition, Atomic %, Except H, for alloy 446 stainless steel before and after treatment.

TABLE 1

| coupon | C | O | Fe | Cr | Si | N | Ca | Cl | S | P |
|---|---|---|---|---|---|---|---|---|---|---|
| before | 40 | 44 | 6 | 5 | 1.1 | 1.2 | 0.5 | 1.2 | 0.5 | 0.6 |
| after | 45 | 38 | 2 | 10 | — | 1.5 | — | 1.1 | 1.7 | — |

Alternatively, the stainless steel can be made active by immersing in hydrochloric acid at room temperature. This allows for the preferential removal of iron from the surface the stainless steel. An example would be to use a 1-10% hydrochloric acid solution and treat the stainless steel at room temperature in this solution for about 1-30 seconds. Longer times would lead to severe etching of the stainless steel, degrading its mechanical properties, particularly when using thin foils (e.g., about 75 to about 100 micrometer) to make the bipolar plate.

Samples of 304L stainless steel were immersed in 10 wt % HCl for about 10 sec at room temperature. The samples were then washed with deionized water, and the surface was examined using XPS analysis. The semi-quantitative surface scan showed that before the HCl treatment, the iron/chromium ratio was about 1:1, while after the treatment it was about 1:4. This indicates significant enrichment of the passive film with chromium as a result of the preferential removal of iron from the passive film. The concentration of HCl was varied from 1-20%. A concentration of 10% and a time of 10 sec was suitable to avoid significant etching of the stainless steel during treatment.

In yet another embodiment, the stainless steel is treated with a concentrated solution of sulfuric acid to activate the surface of the stainless steel and remove iron preferentially from the surface. For this treatment a concentrated solution of 1-30% sulfuric acid is used to activated the surface and to remove iron preferentially. Higher concentrations of sulfuric acid (about 10-30%) can be used at room temperature to accelerate the activation process, while lower concentrations (about 1-10%) can be used at relatively higher temperature 50-80° C. for shorter periods of time (about 1-10 seconds). Hydrogen gas evolution of the surface is a sign that the stainless steel is in the active region and iron is being removed. The removal of iron from the stainless steel was accompanied by reduction in contact resistance, see Table 3. Table 3 shows the total resistance obtained on different entry grades stainless steel substrates before and after room temperature etching in 8M sulfuric acid solution at room temperature.

TABLE 3

| Sample | Total resistance mohm cm2, paper/paper@200 psi | |
|---|---|---|
| | Before etching | After etching |
| 304L SS | 300 | 16 |
| 439 SS"ferritic" | 250 | 17 |
| 446 | 170 | 16.5 |
| 436L "AK" | 240 | 17 |
| 409L SS"AK" | 260 | 15.5-17 |

Another method involves heat treating the stainless steel in air at temperatures greater than about 250° C. The iron diffuses to the surface where it is oxidized preferentially. This takes place in an oxygen-containing environment, such as in air. The surface is then etched chemically (for example, with hydrochloric acid, sulfuric acid, or oxalic acid and hydrogen peroxide) or electrochemically to remove the iron oxide layer to expose the surface underneath which will be rich in chromium and nickel.

Figure 3A:
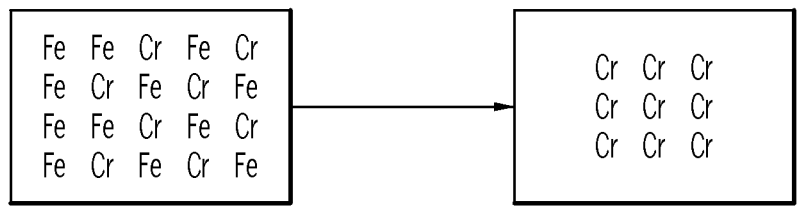
FIGS. 3A-C illustrate the effect of various treatments according to the present invention on the stainless steel surface layer.
Figure 3B:
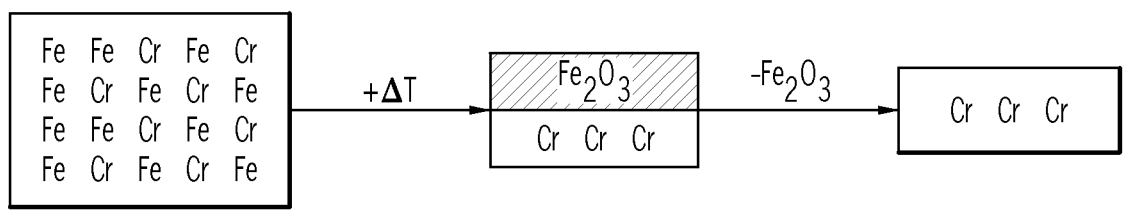
Figure 3C:
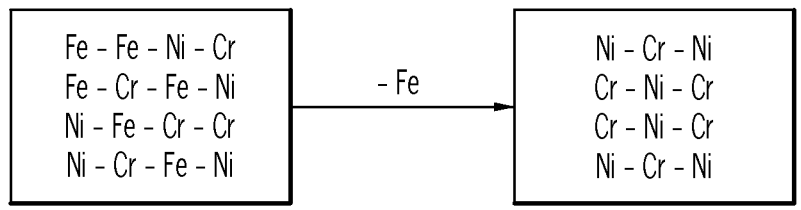

FIGS. 3A-C illustrate the effect of various treatments on the surface composition of the stainless steel. FIG. 3A illustrates the initial surface composition of a stainless steel alloy. FIG. 3B illustrates the surface composition after heat treatment, showing the decrease in iron at the surface and the increase of chromium oxide and vanadium oxide. FIG. 3C illustrates the surface composition after removing the vanadium oxide layer by using, for example, ion sputtering, leaving a layer of chromium oxide that is almost 2 microns thick. The chromium rich layer acts as an adhesion promoter for polymeric gaskets and carbon coatings. In most cases, both polymeric gaskets and carbon coatings require tie layers of chromium or titanium to improve adhesion to the stainless steel surface. The tie layer adds another layer to the coating, while in the present invention, the chromium rich layer is part of the stainless steel surface that should provide excellent self adhesion to polymeric gasketing materials.

A third method involved electropolishing the stainless steel/alloy surface to remove iron, which is less stable than chromium, leaving a surface with enriched with chromium.

With respect to any of the methods, if the surface does not have the desired contact resistance after the surface enriching treatment, it can be thermally nitrided or plasma nitrided to obtain lower contact resistance, if desired.

A fuel cell plate made according to the present invention can be used with any appropriate fuel cell components.

The surface treatment of stainless steel can provide one or more advantages depending on the application involved. It can improve the corrosion resistance of the stainless steel alloy without the use of expensive coatings. It can improve the adhesion of polymeric materials, such as gaskets, to stainless steel surfaces. It can also improve the adhesion of metallic and non-metallic coatings, such as gold, carbon, and the like, to stainless steel surfaces without the necessity of applying an adhesion layer. Improved adhesion is important for use in PEM fuel cells and other applications where chromium or titanium layers are currently required to promote adhesion. In some alloy systems, surface treatment can significantly improve contact resistance on the alloy surface with the gas diffusion layer.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A method of surface alloying stainless steel comprising:
providing a stainless steel surface having an initial amount of iron and an initial amount of chromium; and
preferentially removing iron from the stainless steel surface to obtain a surface having an amount of iron less than the initial amount of iron and an amount of chromium greater than the initial amount of chromium,
wherein preferentially removing iron from the stainless steel surface comprises:
activating the stainless steel surface with hydrochloric acid, or
activating the stainless steel surface with 10-30% sulfuric acid at room temperature, or
activating the stainless steel surface with 1-10% sulfuric acid at 50-80° C. for a duration of about 1-10 seconds.

2. The method of claim 1 further comprising thermally nitriding or plasma nitriding the surface having the amount of iron less than the initial amount of iron and the amount of chromium greater than the amount of chromium.

3. The method of claim 1 wherein the amount of chromium greater than the initial amount of chromium is at least about 20% greater than the initial amount of chromium.

4. The method of claim 1 wherein a thickness of the surface having the amount of iron less than the initial amount of iron and the amount of chromium greater than the initial amount of chromium is in a range of about 1 nm to about 1 micron.

5. A method of surface alloying stainless steel comprising:
providing a stainless steel surface having an initial amount of iron and an initial amount of chromium; and
preferentially removing iron from the stainless steel surface to obtain a surface having an amount of iron less than the initial amount of iron and an amount of chromium greater than the initial amount of chromium,
wherein preferentially removing iron from the stainless steel surface comprises:
heating the stainless steel in air at a temperature of at least about 250° C. so that iron diffuses to the stainless steel surface;
oxidizing the diffused iron to form a layer of iron oxide; and
removing the layer of iron oxide by chemical etching or electrochemical etching.

6. The method of claim 5 wherein removing the layer of iron oxide comprises chemical etching using oxalic acid and hydrogen peroxide.

7. The method of claim 5 further comprising thermally nitriding or plasma nitriding the surface having the amount of iron less than the initial amount of iron and the amount of chromium greater than the amount of chromium.

8. The method of claim 5 wherein the amount of chromium greater than the initial amount of chromium is at least about 20% greater than the initial amount of chromium.

9. The method of claim 5 wherein a thickness of the surface having the amount of iron less than the initial amount of iron and the amount of chromium greater than the initial amount of chromium is in a range of about 1 nm to about 1 micron.

10. A method of surface alloying stainless steel comprising:
providing a stainless steel surface having an initial amount of iron and an initial amount of chromium; and
preferentially removing iron from the stainless steel surface to obtain a surface having an amount of iron less than the initial amount of iron and an amount of chromium greater than the initial amount of chromium,
wherein preferentially removing iron from the stainless steel surface comprises:
electropolishing the stainless steel surface; and
wherein the stainless steel comprises an elemental surface composition consisting essentially of iron, chromium, and optionally one or more of carbon, oxygen, silicon, nitrogen, calcium, chlorine, sulfur, and phosphorus.

11. The method of claim 10 further comprising thermally nitriding or plasma nitriding the surface having the amount of iron less than the initial amount of iron and the amount of chromium greater than the amount of chromium.

12. The method of claim 10 wherein the amount of chromium greater than the initial amount of chromium is at least about 20% greater than the initial amount of chromium.

13. The method of claim 10 wherein a thickness of the surface having the amount of iron less than the initial amount of iron and the amount of chromium greater than the initial amount of chromium is in a range of about 1 nm to about 1 micron.

* * * * *